(12) United States Patent
Wrensch et al.

(10) Patent No.: US 8,919,813 B2
(45) Date of Patent: Dec. 30, 2014

(54) TRACTOR WEIGHT TRANSFER MECHANISM

(71) Applicant: Schiller Grounds Care, Inc., Southampton, PA (US)

(72) Inventors: Norman Kurt Wrensch, Watertown, WI (US); Paul Kinsman, Fort Atkinson, WI (US); Franklin Robert Pohlman, Jr., Fort Atkinson, WI (US); Richard Lee Bedford, Watertown, WI (US); Anthony S. Weber, Lake Mills, WI (US); Nikolaus Harmsen, Watertown, WI (US)

(73) Assignee: Schiller Grounds Care, Inc., Southampton, PA (US)

( * ) Notice: Subject to any disclaimer, the term of this patent is extended or adjusted under 35 U.S.C. 154(b) by 0 days.

(21) Appl. No.: 13/890,681

(22) Filed: May 9, 2013

(65) Prior Publication Data
US 2013/0300095 A1 Nov. 14, 2013

Related U.S. Application Data

(60) Provisional application No. 61/644,734, filed on May 9, 2012.

(51) Int. Cl.
*B60S 9/22* (2006.01)
*A01B 59/06* (2006.01)
*A01B 63/11* (2006.01)
*A01B 63/12* (2006.01)

(52) U.S. Cl.
CPC ............... *A01B 59/064* (2013.01); *A01B 63/11* (2013.01); *A01B 63/12* (2013.01)

USPC ............................ 280/758; 280/755; 280/769

(58) Field of Classification Search
USPC .......... 180/755, 758, 759, 769; 280/755, 758, 280/759, 769
See application file for complete search history.

(56) References Cited

U.S. PATENT DOCUMENTS

| 2,711,227 | A | 6/1955 | Shimmon |
| 3,504,933 | A | 4/1970 | Avis |
| 3,851,894 | A | 12/1974 | St. Pierre |
| 3,905,180 | A | 9/1975 | Akgulian et al. |

(Continued)

OTHER PUBLICATIONS

U.S. Appl. No. 61/644,734, filed May 9, 2012 (Wrensch et al.).

(Continued)

*Primary Examiner* — Hau Phan
*Assistant Examiner* — Bryan Evans
(74) *Attorney, Agent, or Firm* — Panitch Schwarze Belisario & Nadel LLP

(57) ABSTRACT

A weight transfer system for a tractor includes a front lift arm pivotably mounted to the tractor and a front accessory mounted to the front lift arm. The front accessory is located forward of a front of the tractor. A mounting bracket is secured to a frame of the tractor. An electric linear actuator includes a forward end and a rear end. The forward end is mounted to a spring and the rear end is mounted to the mounting bracket. The linear actuator is actuable between an extended position and a retracted position. The forward end is spaced a first distance from the front of the tractor in the extended position and a second distance from the front of the tractor in the retracted position. The first distance is less than the second distance.

18 Claims, 5 Drawing Sheets

(56) References Cited

U.S. PATENT DOCUMENTS

| | | | |
|---|---|---|---|
| 4,232,883 A | 11/1980 | Bourgeous et al. | |
| 4,322,094 A | 3/1982 | Bobard | |
| 4,333,250 A | 6/1982 | Henderson | |
| 4,664,404 A | 5/1987 | Schultz | |
| 4,747,257 A * | 5/1988 | Hutchison | 56/15.8 |
| 4,861,069 A | 8/1989 | Gunter | |
| 5,082,065 A | 1/1992 | Fletcher | |
| 5,131,802 A * | 7/1992 | Sunami et al. | 414/719 |
| 5,156,215 A | 10/1992 | Jensen | |
| 5,197,347 A | 3/1993 | Moffitt et al. | |
| 5,685,563 A | 11/1997 | Ottestad | |
| 6,237,711 B1 | 5/2001 | Hunt | |
| 6,279,937 B1 | 8/2001 | Hunt | |
| 6,367,574 B1 | 4/2002 | Steiner | |
| 6,502,334 B1 | 1/2003 | Davies | |
| 6,880,854 B2 | 4/2005 | Powell | |
| 6,957,505 B1 | 10/2005 | Moffitt | |
| 6,964,121 B2 | 11/2005 | Harris | |
| 7,195,096 B1 | 3/2007 | Mawhinney | |
| 7,571,788 B2 | 8/2009 | Barnard | |
| 7,635,045 B2 | 12/2009 | Shearer et al. | |
| 7,815,009 B1 | 10/2010 | Speelman, Jr. | |
| 7,828,107 B2 | 11/2010 | Yoshikawa et al. | |
| 7,841,109 B2 | 11/2010 | Stevens et al. | |
| 7,841,110 B2 | 11/2010 | Koch et al. | |
| 7,877,993 B2 | 2/2011 | Sakamoto | |
| 7,905,080 B2 | 3/2011 | Uemura et al. | |
| 7,913,798 B2 | 3/2011 | Frett et al. | |
| 7,963,052 B2 | 6/2011 | Koch et al. | |
| 8,065,822 B2 | 11/2011 | Maas et al. | |
| 8,091,678 B2 | 1/2012 | Rowan et al. | |
| 8,104,566 B2 | 1/2012 | Harber et al. | |
| 8,109,069 B2 | 2/2012 | Moe et al. | |
| 8,131,433 B2 | 3/2012 | Bordini | |
| 8,136,839 B2 | 3/2012 | Bourn | |
| 8,146,704 B2 | 4/2012 | Ruhter et al. | |
| 8,167,080 B2 | 5/2012 | Ruhter et al. | |
| 2008/0028882 A1 * | 2/2008 | Sakamoto | 74/473.17 |
| 2008/0073090 A1 | 3/2008 | Harris | |
| 2008/0116674 A1 * | 5/2008 | Baer | 280/769 |
| 2008/0172913 A1 | 7/2008 | Bailey et al. | |
| 2008/0211216 A1 | 9/2008 | Fortin | |
| 2009/0182471 A1 * | 7/2009 | Bucher et al. | 701/50 |
| 2009/0307940 A1 | 12/2009 | Maas et al. | |
| 2010/0156079 A1 | 6/2010 | Nakashima | |
| 2012/0103717 A1 | 5/2012 | Ruhter et al. | |

OTHER PUBLICATIONS

"Ventrac, Your One Tractor Solution", Tractor and Attachment Catalog (Admitted Prior Art).

* cited by examiner

TRACTOR WEIGHT TRANSFER MECHANISM

CROSS-REFERENCE TO RELATED APPLICATIONS

The present application claims the benefit of U.S. Provisional Patent Application No. 61/644,734, filed on May 9, 2012, entitled "Tractor Weight Transfer Mechanism," the entire contents of which is incorporated herein by reference in its entirety

BACKGROUND OF THE INVENTION

Tractors having front attachments such as mower decks have been utilized for many years. These front attachments are frequently heavy and change the weight distribution on the wheels of the tractor, typically by shifting weight or moving the center of gravity of the tractor toward the front of the tractor. The change in weight distribution can be particularly pronounced when the tractor is traversing a slope, thereby impacting the traction capabilities of the various wheels of the tractor. For example, a relatively heavy front attachment on a tractor that is driving across a relatively steep slope has a tendency to pull the front of the tractor down the hill or point the front of the tractor down the slope. When straight line travel of the tractor is desired, such pulling of the tractor can impact performance and burden the operator, because the operator is forced to constantly fight the tractor in attempts to maintain the straight-line movement of the tractor across the slope while the tractor wants to point its front end down the slope.

Systems have been developed to shift or transfer weight from the front accessory rearwardly toward the center of gravity of the tractor to reduce the front weight impact of the accessory. These systems require the operator to dismount the tractor and engage the weight transfer system. These systems include manually engageable springs and pressure regulated systems that are actuable when the operator dismounts the tractor. These systems are undesirable in that the operator may have to frequently mount and dismount the tractor to engage and/or disengage the system, thereby reducing production and/or are difficult to install. These mechanical systems may also create pinch points and can be difficult to operate, particularly if the components are corroded or unlubricated. Such systems may also be prone to mechanical failures, difficult operation due to extended use and/or corrosion, thereby adding significant expense and potential downtime to repair malfunctioning components. It would be desirable to design and implement a weight transfer system that addresses the limitations of the prior systems and the preferred device of the present application addresses these design concerns.

BRIEF SUMMARY OF THE INVENTION

A weight transfer system for a tractor to improve traction of the tractor including a front lift arm pivotably mounted to the tractor and a front accessory mounted to the front lift arm. The front accessory located generally forward of a front of the tractor. A mounting bracket is secured to a frame of the tractor. A spring includes a first end and a second end, wherein the first end is attached to the front lift arm. An electric linear actuator includes a forward end and a rear end. The forward end is mounted to the spring and the rear end is mounted to the mounting bracket. The linear actuator is actuable between an extended position and a retracted position. The forward end is spaced a first distance from the front of the tractor in the extended position and a second distance from the front of the tractor in the retracted position. The first distance is less than the second distance.

In another aspect, the preferred invention is directed to a weight transfer system for a tractor to improve traction of the tractor. The weight transfer system includes a front lift arm pivotably mounted to the tractor, a front accessory mounted to the front lift arm and a mounting bracket secured to a frame of the tractor. The front accessory is located generally forward of a front of the tractor. A spring includes a first end and a second end, wherein the first end is attached to the front lift arm. An actuator includes a forward end and a rear end. The forward end is mounted to the spring and the rear end is mounted to the mounting bracket. The actuator is actuable between an extended position and a retracted position. The forward end is spaced a first distance from the front of the tractor in the extended position and a second distance from the front of the tractor in the retracted position. The first distance is less than the second distance and the actuator is movable to a plurality of positions between the extended position and the retracted position.

BRIEF DESCRIPTION OF THE SEVERAL VIEWS OF THE DRAWINGS

The foregoing summary, as well as the following detailed description of the preferred invention, will be better understood when read in conjunction with the appended drawings. For the purpose of illustrating the preferred invention, there are shown in the drawings embodiments which are presently preferred. It should be understood, however, that the invention is not limited to the precise arrangements and instrumentalities shown. In the drawings:

FIG. 1A is a front elevational view of an indicator that may be employed with the tractor and weight transfer mechanism of FIG. 1 in accordance with the preferred embodiment of the present invention;

DETAILED DESCRIPTION OF THE INVENTION

Figure 1:
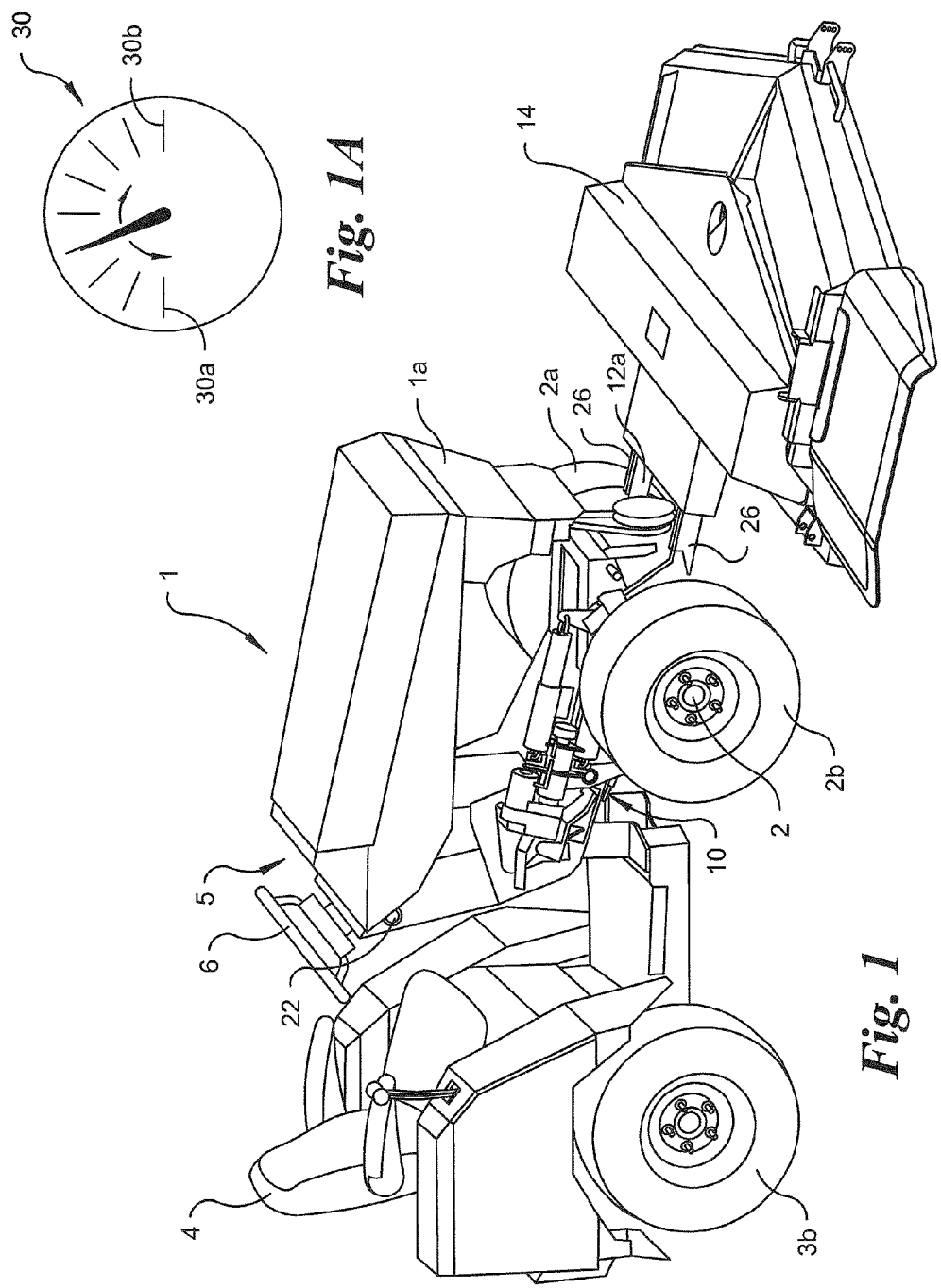
FIG. 1 is a side perspective view of a tractor with a weight transfer system mounted thereon in accordance with a preferred embodiment of the present invention.
Figure 2:
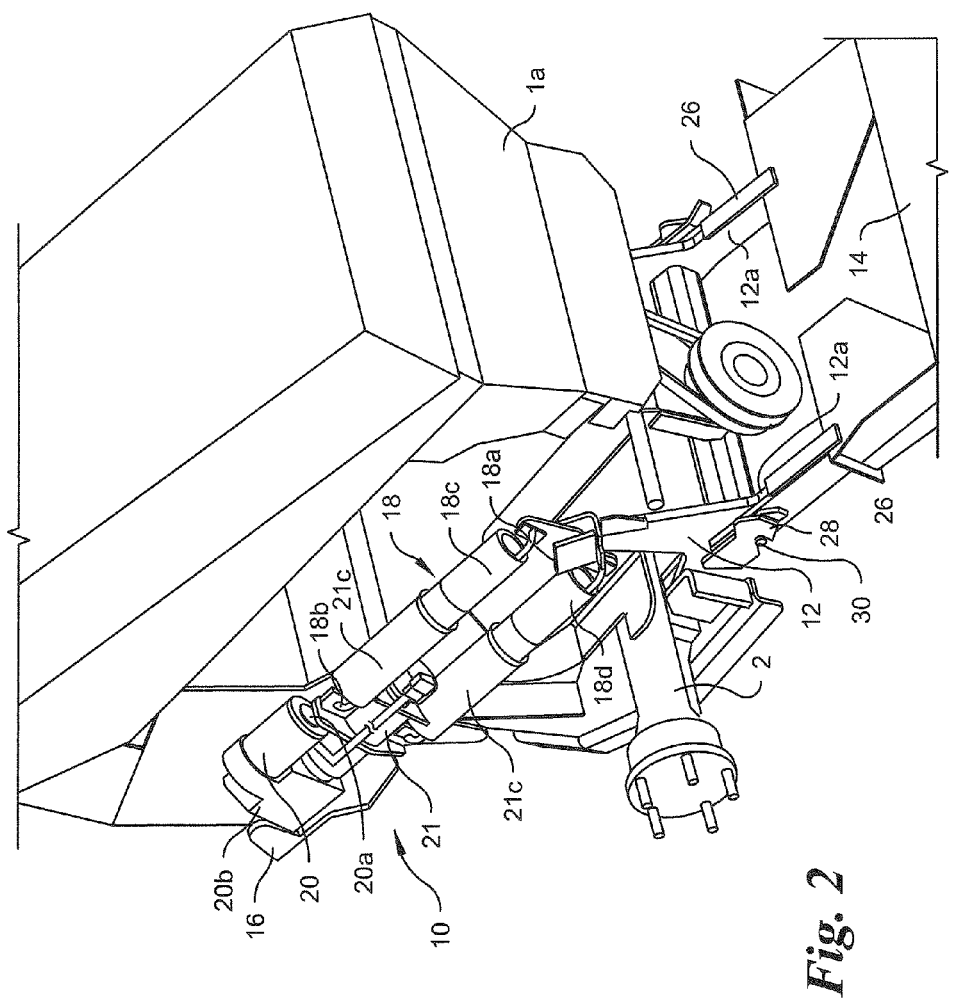
FIG. 2 is a top perspective, magnified view of the preferred weight transfer mechanism mounted to the tractor of FIG. 1, wherein the weight transfer mechanism is in an extended position.
Figure 3:
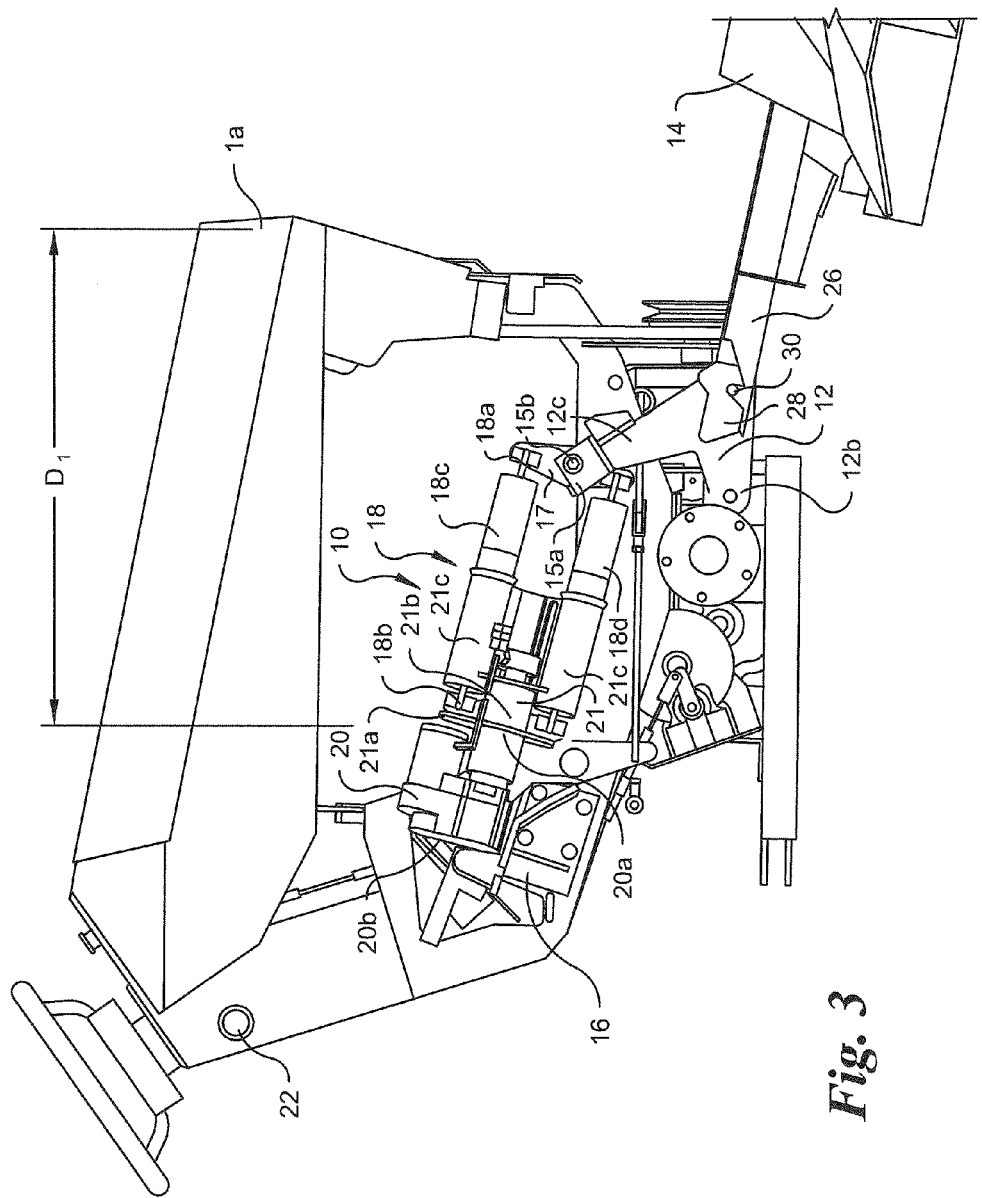
FIG. 3 is a side elevational view of the weight transfer mechanism of FIG. 2.
Figure 4:
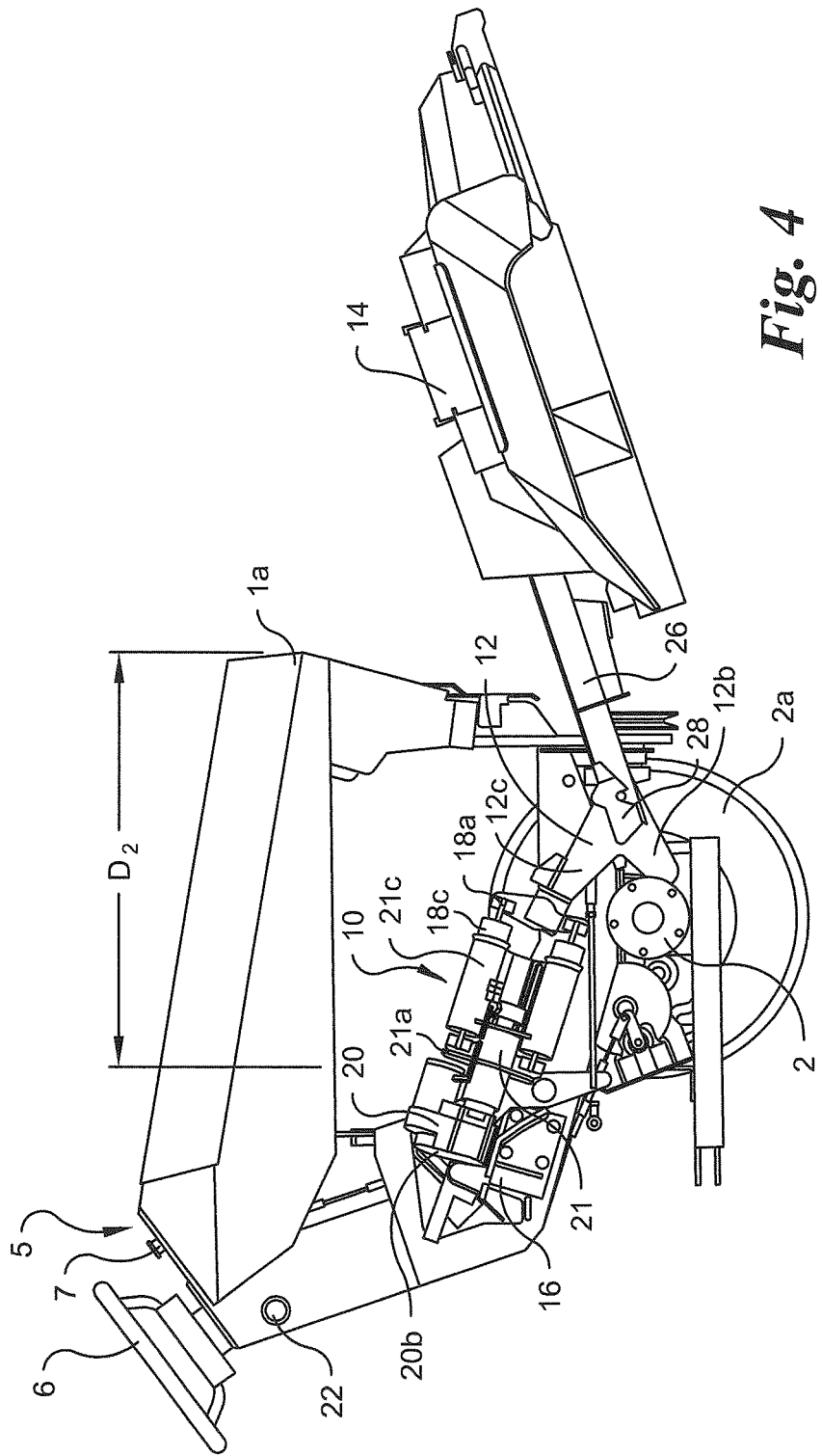
FIG. 4 is a side elevational view of the weight transfer mechanism of FIG. 2, wherein the weight transfer mechanism is in a retracted position.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

Referring to FIGS. 1-4, a preferred embodiment of the present invention is directed to a weight transfer system or mechanism, generally designated 10, that is mounted to a tractor 1 to improve traction of the tractor 1. The tractor 1 preferably includes a front axle 2 with right and left wheels 2a, 2b, a rear axle 3 with right and left wheels 3a, 3b, a seat 4 for the operator and a dashboard 5 including a steering wheel 6 and various additional controls 7 mounted thereon or extending therefrom. The tractor 1 may be a four-wheel drive vehicle wherein the front and rear wheels 2a, 2b, 3b provide driving force to move the tractor 1 along the ground or may be a two-wheel drive vehicle wherein only the front wheels 2a, 2b or the rear wheels 3b provide the driving force.

A front lift arm 12 is pivotably mounted to the frame of the tractor 1, preferably proximate the front axle 2 and, most preferably, slightly forward of the front axle 2. The front lift arm 12 preferably includes front forks 12a that extend forwardly, a pivot mount 12b that pivotably mounts to a frame of the tractor 1 proximate the front axle 2 and a top arm 12c. The front lift arm 12 is preferably constructed of a relatively strong, stiff and durable material that is able to take on the general size and shape of the front lift arm 12 and withstand the normal operating conditions of the front lift arm 12. In a preferred embodiment, the front lift arm 12 may be constructed of a metallic material, such as steel, a composite material or nearly any relatively strong, stiff and durable material.

A front accessory 14 is mounted to the front lift arm 12, preferably at least at the front forks 12a. The front accessory 14 is located generally forward of a front 1a of the tractor 1. The front accessory 14 may be comprised of nearly any accessory that could be utilized with the tractor 1. For example, the front accessory 14 may include a lawn mower deck, a snow blower, a trench digger, a sweeper, a plow, a dump bucket, a hole digger, a chipper and an aerator, but is not so limited and may be nearly any variety of accessory that may be utilized and/or driven by the tractor 1. The front accessory 14 preferably includes two L-shaped arms 26 extending rearwardly from the main body of the front accessory 14 that are complimentary to and mount to the front forks 12a in an engaged position. An accessory locking hook 28 is pivotably mounted to the front fork 12a of the front lift arm 12 and is biased toward a securing position by a biasing spring (not shown). A locking pin 30 extends laterally outwardly from the L-shaped arms 26 and the accessory locking hook 28 captures the locking pin 30 in the engaged position to secure the front accessory 14 to the tractor 1. In addition, the L-shaped arms 26 engage the front forks 12a when the front accessory 14 is mounted to the front lift arm 12 in the engaged position. To disengage the front accessory 14 from the tractor 1, the locking hook 28 is mechanically or manually pivoted upwardly out of engagement with the locking pin 30 and the tractor 1 is moved rearwardly such that the front forks 12a slide out of engagement with the L-shaped arms 26.

A mounting bracket 16 is secured to the frame of the tractor 1, preferably to a side of the frame of the tractor 1 between the seat 4 and the front axle 2. The mounting bracket 16 is preferably fixedly mounted to the side of the tractor 1 and is constructed of a relatively stiff, strong and durable material, such as a metallic material. The preferred weight transfer system 10 includes a single right or right side mounting bracket 16 mounted to the right side of the frame of the tractor 1, but is not so limited and may be mounted only on the left side or on both the left and right sides of the tractor 1. The mounting bracket 16 may be comprised of right and left side mounting brackets 16 mounted to each side of the frame, such that there are mirror image preferred weight transfer systems 10 on each side of the tractor 1. The front axle 2 is positioned between the mounting bracket 16 and the front lift arm 12 in the preferred embodiment to facilitate weight transfer from the front accessory 14 toward the center of gravity of the tractor 1 and generally onto the front axle 2 and the front wheels 2a, 2b of the tractor 1.

A spring 18 includes a first end 18a and a second end 18b. The first end 18a is attached to the front lift arm 12. In the preferred embodiment, the spring 18 is comprised of a spring assembly 18 including a first spring 18c and a second spring 18d. The spring and/or spring assembly 18 is not limited to first and second springs 18c, 18d and may be comprised of a single spring or more than two springs on either side of the tractor 1, as desired by the operator or designer. In addition, the spring and/or spring assembly 18 may be implemented on one or both sides of the tractor 1, as will be described in greater detail below. The spring 18 may also be comprised of a plurality of springs mounted to one or both sides of the tractor 1. The spring 18 is preferably sized and configured to safely carry loads typically encountered by the spring 18 during normal operating conditions and to help support nearly any front accessory 14 that may be mounted to the tractor 1. The spring 18 may also be comprised of right side and left side springs associated with mirror image weight transfer systems 10 mounted on each side of the tractor 1.

An electric linear actuator 20 includes a forward end 20a and a rear end 20b. The forward end 20a is mounted to the spring 18 and the rear end 20b is mounted to the mounting bracket 16. The linear actuator 20 is actuable between an extended position and a retracted position. The forward end 20a is spaced a first distance D1 from the front 1a of the tractor 1 in the extended position and a second distance D2 from the front 1a of the tractor 1 in the retracted position. The first distance D1 is less than the second distance D2. The electric linear actuator 20 may also be comprised of right side and left side linear actuators 20, each associated with the mirror image weight transfer systems 10 on each side of the tractor 1.

The weight transfer system 10 of the preferred embodiment also includes a spring guide and support 21 mounted between the linear actuator 20 and the spring 18. The spring guide and support 21 attaches the actuator 20 to the spring 18. The spring guide and support 21 preferably includes a spring plate 21a to secure the actuator 20 to the springs 18c, 18d, a central guide cylinder 21b that guides the preferred linearly motion of the spring guide and support 21 and the springs 18c, 18d relative to the actuator 20 and a pair of spring safety shields or first and second spring cylinders 21c fixed to the central guide cylinder 21b that generally surround the springs 18c, 18d to limit direct contact with the springs 18c, 18d and generally guide the movement of the springs 18c, 18d. The pair of spring safety shields 21c are preferably comprised of first and second cylindrical spring cylinders 21c that at least partially surround the first and second springs 18c, 18d, respectively. The weight transfer system 10 is not limited to inclusion of the spring guide and support 21, but the spring guide and support 21 is preferred to provide an attachment for the springs 18c, 18d to the actuator 20, maintain alignment of the weight transfer system 10, limit rotation of an actuator shaft (not shown) of the actuator 20 and permits the front accessory 14 to move through its full range of motion without impeding or assisting the travel of the accessory 14 as the spring guide and support 21 facilitates a float feature between the actuator 20 and the front lift arm 12.

Regarding the float feature between the actuator 20 and the front lift arm 12, in the preferred embodiment, the linear actuator 20 includes a bushing or bearing (not shown) that is secured to an actuator shaft (not shown). The free floating bushing or bearing on the actuator shaft provides for the floating feature and permits movement of the front lift arm 12 and the accessory 14 in a conventional manner.

In the preferred embodiment, the weight transfer system 10 also includes an actuation switch 22 mounted to the tractor 1 proximate a dashboard 5 of the tractor 1 or at the side of the frame of the tractor 1 proximate the dashboard 5. The actuation switch 22 is in electrical communication with the linear actuator 20 to prompt or actuate the linear actuator 20 to move between the extended and retracted positions and to a nearly infinite number or a plurality of linear positions between the extended and retracted positions. Providing for a nearly infinite number or plurality of positions between the extended and retracted positions permits the user to customize the amount of weight transferred to the front axle 2 by the preferred weight transfer system 10 in use. The actuation switch 22 is preferably mounted proximate the dashboard 5 such that the user is able to actuate the linear actuator 20 without getting out of the seat 4 while operating the tractor 1. Accordingly, in the preferred embodiment, the operator is able to relatively, easily actuate the weight transfer system 10 to shift weight of the accessory 14 toward a center of gravity of the tractor 1, generally onto the front axle 2 to improve traction of the tractor 1. The preferred linear actuator 20 is not limiting and the actuator 20 may be comprised of nearly any mechanism or component that is able to expand and/or contract upon command by the operator, preferably by manipulating a controller proximate the dashboard 5. For example, the actuator 20 may be comprised of a hydraulic actuator or cylinder that moves similarly to the linear actuator 20 by depressing the actuation switch 22. In addition, the actuator 20 may be comprised of a motor driven screw and plate (not shown) that expand and contract to shift load from the front lift arm 12 toward the center of gravity of the tractor 1 or generally onto the front axle 2.

The weight transfer system 10 of the preferred embodiment also includes a front spring mounting bracket 17 mounting the first end 18a of the spring 18 to the front lift arm 12. The front spring mounting bracket 17 is preferably pivotably mounted to the front lift arm 12 such that the spring 18 and front lift arm 12 are able to pivot relative to each other as the linear actuator 20 moves to and between the extended and retracted positions. The weight transfer system 10 is not limited to inclusion of the front spring mounting bracket 17, as the spring 18 may be directly connected to the front lift arm 12 or otherwise connected to the front lift arm 12 through a variety of other connection methods, assemblies and/or systems. In the preferred embodiment, the front spring mounting bracket 17 is pivotably mounted to the top arm 12c of the front lift arm 12 by a U-shaped bracket or clevis 15a on the top arm 12c and a bolt 15b that is secured to the front spring mounting bracket 17.

Figure 5:
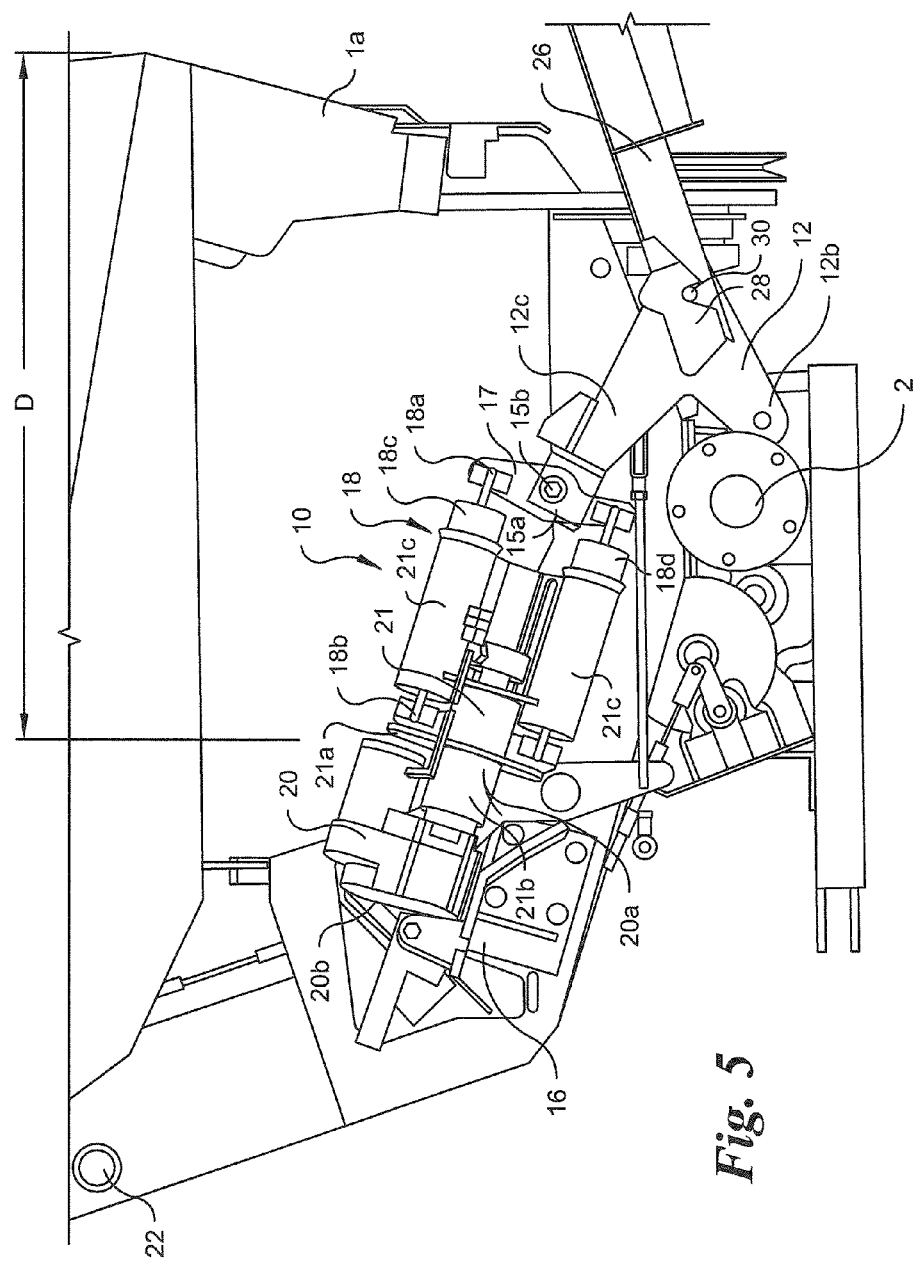
FIG. 5 is a magnified side elevational view of the weight transfer mechanism of FIG. 4.

In the preferred embodiment, the weight transfer system 10 is mounted on one side of the tractor 1, as is shown in FIG. 5. However, in an alternative embodiment, the weight transfer system 10 may be implemented with pairs of mounting brackets 16, springs 18 and electric linear actuators 20, including right and left mounting brackets 16, right and left springs 18 and right and left electric linear actuators 20. Accordingly, the weight transfer system 10 may include mirror images of its components on either side of the tractor 1 for balance and support of the accessories 14. The weight transfer system 10 is not limited to having mirror images of its elements on both sides of the tractor 1, as is shown in the preferred embodiment of FIGS. 1-5 with the weight transfer system 10 mounted to only one side of the tractor 1. In addition, the weight transfer system 10 may alternatively be installed with different numbers, types and/or varieties of its elements on either or both sides of the tractor 1.

In operation, in the preferred embodiment, the operator mounts one of the front accessories 14 to the front forks 12a. The tractor 1 is preferably driven toward the front accessory 14 such that the front forks 12a align with the L-shaped arms 26 and the L-shaped arms 26 guide the forward movement of the front forks 12a such that the accessory locking hooks 28 pivot upwardly over the locking pins 30 and subsequently the accessory locking hooks 28 pivot into engagement with the locking pins 30 to lock the L-shaped arms 26 onto the front forks 12a. Generally, the weight transfer system 10 is configured with the linear actuator 20 in the extended position with limited load in the spring 18. During operation of the tractor 1, the operator may perceive or anticipate traction could be a problem, such as when traversing a slope laterally with the relatively heavy accessory 14 mounted to the front forks 12a. In such a situation, the operator may depress the actuation switch 22, which causes the linear actuator 20 to move from the extended position to the retracted position. This movement causes additional load to be applied to the spring 18, thereby shifting load from the front mounted accessory 14 toward the center of gravity of the tractor 1 and in large part to the front axle 2 and the front wheels 2a, 2b in the preferred embodiment. Such shifting of the weight preferably improves the traction of the tractor 1. Use of the electric linear actuator 20 that may be actuated by the actuation switch 22 permits the operator to shift the weight without moving from the seat 4 and is relatively reliable, reducing the likelihood of certain mechanical failures that may manifest in existing systems.

The weight transfer kit or system 10 of the preferred embodiment transfers weight from the front mounted accessory 14 to the front axle 2 of the tractor 1, typically for increased traction. The weight transfer kit or system 10 includes the mounting bracket 16, the electric actuator 20 and the spring 18. In the preferred embodiment, the spring 18 includes the first and second springs 18c, 18d that are comprised of heavy duty extension springs 18c, 18d. The actuation switch 22 is mounted to the frame of the tractor 1 proximate the dashboard 5 and may be included with the tractor 1 upon purchase or the weight transfer system 10 may be supplied to operators as a kit or post-sale attachment. The actuation switch 22 is used to extend or retract the actuator 20 and the actuator 20 may be extended to numerous positions to and between the extended and retracted positions to transfer various amounts of weight toward or onto the front axle 2 or for distribution onto the frame of the tractor 1. The mounting bracket 16 preferably mounts to existing holes on the front frame of the tractor 1. The actuator 20 preferably mounts to the mounting bracket 16 on the fixed or rear end 20b of the actuator 20. The spring 18 is mounted to the output, front or moveable end 20a of the actuator 20. The springs 18 are connected to the front lift arm 12 and the various attachments 14 are mounted to the front lift arm 12, preferably as was described above. The front lift arms 12 preferably include the front forks 12a that engage the L-shaped and rearwardly extending arms 26 of the front accessory 14.

When the actuator 20 is fully extended, the springs 18 are preferably contracted, and thus are not pulling on the front lift arms 12a, however, the springs 18 may extend if the front accessory 14 encounters a hole or a dip in the ground being traversed by the tractor 1. In this situation, little or no weight is being transferred by the weight transfer system or mechanism 10 from the front accessory 14 onto the front axle 2 or into the frame of the tractor 1. When the actuator 20 is fully retracted, it pulls the springs 18 toward the rear of the tractor 1 such that the springs 18 are extended, thus pulling on the front lift arm 12 and transferring a portion of the weight of the accessory 14 to the tractor 1, preferably onto the front axle 2. The springs 18 preferably span the front axle 2 and pull on both sides of the front lift arm 12 and the rear of the tractor 1, thereby increasing ground force on the front wheels 2a, 2b while decreasing ground force on both the accessory 14 and the rear wheels 3a, 3b.

Referring to FIG. 5, the installation and operation of the preferred weight transfer system 10 involves no invasive procedures or alterations to the tractor 1, particularly in comparison to existing systems. The preferred weight transfer system 10 is relatively easy to use and provides desired weight shifting effects for the tractor 1.

Referring to FIGS. 1-5, the weight transfer system 10 of the preferred embodiment may include an indicator 30 that indicates to the operator the status of the weight transfer system 10. In the preferred embodiment, the indicator 30 is comprised of a gauge or scale that indicates how little or how much load is transferred at any given time. The indicator 30 preferably indicates if the spring 18 has little or no load at a minimum weight transfer end 30a and if the spring 18 has a relatively large or maximum load at a full weight or maximum weight transfer end 30b. The indicator 30 may be comprised of a mechanical scale 30 mounted proximate the linear actuator 20 with a dial 31 that is secured to and moves with the spring guide and support 21 as the actuator 20 is moved. The dial 31 may be positioned to move relative to a scale that indicates a position between minimum and maximum of the weight transfer system 10. The indicator 30 may be comprised of a gauge 30 mounted on the dashboard 5 that is attached to a sensor (not shown) for calculating and displaying the amount of weight transferred from the accessory 14 toward the front axle 2. The weight transfer system 10 is not limited to including the indicator 30 and may operate without the indicator 30 or with alternative indicators to that shown in FIG. 1A.

Although the weight transfer system 10 of the preferred embodiment is described herein as transferring the weight of the front accessory 14 rearwardly toward the center of gravity of the tractor 1 and primarily onto the front axle 2 and the front wheels 2a, 2b, the weight transfer system 10 is not so limited. For example, the weight transfer mechanism 10 may be configured as a rear weight transfer mechanism with a rear fork pivotably mounted to the frame of the tractor 1 rearwardly of a rear axle and the mounting bracket mounted forward of the rear axle. The rear weight transfer system would have generally the same components and features as the front weight transfer system 10 of the preferred embodiment, but would be configured and arranged to engage a rear attachment and have a configuration that would be understood by one having ordinary skill in the art based on a review of the present disclosure. The preferred weight transfer system may alternatively be configured to engage a side or mid-mounted accessory to transfer weight of such an accessory toward the center of gravity of the tractor 1 to improve stability of the tractor 1 during use.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

We claim:

1. A weight transfer system for a tractor to improve traction of the tractor, the weight transfer system comprising:
a front lift arm pivotably mounted to the tractor;
a front accessory mounted to the front lift arm, the front accessory located generally forward of a front of the tractor;
a mounting bracket secured to a frame of the tractor;
a spring including a first end and a second end defining a longitudinal spring axis, the first end attached to the front lift arm; and
an electric linear actuator including a forward end and a rear end, the actuator having a longitudinal actuator axis, the longitudinal spring axis being substantially parallel to the longitudinal actuator axis, the forward end mounted to the second end of the spring and the rear end mounted to the mounting bracket, the linear actuator actuable between an extended position and a retracted position, the forward end spaced a first distance from the front of the tractor in the extended position and a second distance from the front of the tractor in the retracted position, the first distance being less than the second distance.

2. The weight transfer system of claim 1 further comprising:
an actuation switch mounted to the tractor proximate a dashboard of the tractor.

3. The weight transfer system of claim 1 wherein the front accessory is selected from the group consisting of a lawn mower deck, a snow blower, a trench digger, a sweeper, a plow, a dump bucket, a hole digger, a chipper and an aerator.

4. The weight transfer system of claim 1 further comprising:
a front spring mounting bracket mounting the first end to the front lift arm, the front spring mounting bracket pivotably mounted to the front lift arm.

5. The weight transfer system of claim 1 wherein the spring is comprised of a spring assembly including a first spring and a second spring.

6. The weight transfer system of claim 1 wherein the spring is comprised of a spring assembly including a plurality of springs.

7. The weight transfer system of claim 1 wherein the mounting bracket includes a right mounting bracket and a left mounting bracket, the spring includes a right spring and a left spring and the electric linear actuator includes a right electric linear actuator and a left electric linear actuator.

8. A weight transfer system for a tractor to improve traction of the tractor, the weight transfer system comprising:
a front lift arm pivotably mounted to the tractor;
a front accessory mounted to the front lift arm, the front accessory located generally forward of a front of the tractor;
a mounting bracket secured to a frame of the tractor;
a spring including a first end and a second end defining a spring axis, the first end attached to the front lift arm; and
an actuator including a forward end and a rear end defining an actuator axis, the spring axis positioned substantially parallel to the actuator axis, the forward end mounted to the second end of the spring and the rear end mounted to the mounting bracket, the actuator actuable between an extended position and a retracted position, the forward end spaced a first distance from the front of the tractor in the extended position and a second distance from the front of the tractor in the retracted position, the first distance being less than the second distance, the actuator movable to a plurality of positions between the extended position and the retracted position.

9. The weight transfer system of claim 8 further comprising:

an indicator providing an indication to an operator regarding the position of the actuator one of at and between the extended position and the retracted position.

10. The weight transfer system of claim 8 wherein the actuator is comprised of an electric linear actuator.

11. The weight transfer system of claim 8, wherein the spring includes a first spring and a second spring.

12. The weight transfer system of claim 11, wherein the linear actuator includes a first spring cylinder and a second spring cylinder, the first spring positioned at least partially within the first spring cylinder and the second spring positioned at least partially within the second spring cylinder.

13. The weight transfer system of claim 11, further comprising:
   a front spring mounting bracket pivotably mounted to the front lift arm, the first and second springs connected to the front spring mounting bracket.

14. The weight transfer system of claim 8, further comprising:
   an accessory locking hook pivotably mounted to a front fork of the front lift arm, the front accessory including a L-shaped arm and a locking pin extending laterally from the L-shaped arm, the L-shaped arm engaged with the front fork when the front accessory is mounted to the front lift arm in an engaged position, the accessory locking hook engaging the locking pin in the engaged position.

15. The weight transfer mechanism of claim 8, wherein the front lift arm includes a front fork, a pivot mount and a top arm, the front lift arm configured for pivotable movement relative to the frame of the tractor by a pivot connection that secures the pivot mount to the frame.

16. The weight transfer mechanism of claim 8, further comprising:
   a front spring mounting bracket pivotably connected to the front lift arm, the front spring bracket including an upper portion and a lower portion, the spring including a first spring and a second spring, the first spring secured to the upper portion and the second spring secured to the lower potion.

17. The weight transfer mechanism of claim 8, wherein mounting bracket and the front lift arm are mounted to the frame with a front axle of the tractor positioned between the mounting bracket and the front lift arm.

18. The weight transfer mechanism of claim 8, wherein the front lift arm is pivotably mounted to the frame of the tractor proximate the front axle.

* * * * *